United States Patent
Funayose

(10) Patent No.: US 7,362,278 B2
(45) Date of Patent: Apr. 22, 2008

(54) GPS-EQUIPPED METER

(75) Inventor: Yusuke Funayose, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 174 days.

(21) Appl. No.: 11/237,759

(22) Filed: Sep. 29, 2005

(65) Prior Publication Data

US 2007/0247377 A1    Oct. 25, 2007

(30) Foreign Application Priority Data

Sep. 29, 2004  (JP) .............................. 2004-284911
Jul. 8, 2005   (JP) .............................. 2005-200166

(51) Int. Cl.
  *H01Q 1/32*   (2006.01)
  *G01C 21/00*  (2006.01)
(52) U.S. Cl. ...................... 343/711; 701/213
(58) Field of Classification Search ................ 343/711, 343/712, 713, 714; 701/213; 342/357.06
See application file for complete search history.

(56) References Cited

U.S. PATENT DOCUMENTS

| 6,751,552 | B1  |   | 6/2004  | Minelli |
| 7,142,980 | B1  | * | 11/2006 | Laverick et al. ............. 701/213 |
| 7,209,830 | B2  | * | 4/2007  | Takahashi .................... 701/213 |
| 2002/0016674 | A1 | * | 2/2002  | Rudow et al. ............... 701/215 |
| 2004/0135722 | A1 |   | 7/2004  | Takahashi |
| 2004/0246607 | A1 | * | 12/2004 | Watson et al. ............... 359/872 |
| 2005/0052334 | A1 | * | 3/2005  | Ogino et al. ................. 343/866 |
| 2005/0146445 | A1 | * | 7/2005  | Sleboda et al. ............. 340/988 |

FOREIGN PATENT DOCUMENTS

| DE | 199 47 506 A1 | 4/2001 |
| JP | 08-162843 A   | 6/1996 |
| JP | 11-321754 A   | 11/1999 |

OTHER PUBLICATIONS

Patent Abstracts of Japan, Takahashi Hiroyuki, Apr. 8, 1997, abstract only.

* cited by examiner

*Primary Examiner*—Huedung Mancuso
(74) *Attorney, Agent, or Firm*—Birch, Stewart, Kolasch & Birch, LLP

(57) ABSTRACT

A versatile GPS-equipped meter includes a GPS antenna and a GPS processing circuit in an existing meter unit. Posture adjusting members are provided that have different shapes according to an attachment angle θ of a GPS-equipped meter to a vehicle body frame are appropriately selected so as to point a GPS antenna to the sky regardless of the attachment angle θ. In a meter case, an antenna relief part is secured. Accordingly, even if a relative positional relationship between the meter case and the GPS antenna is changed due to a change in the shape of the posture adjusting member, the meter case and the GPS antenna never interfere with each other. Thus, the GPS-equipped meter can be shared with various vehicles without increasing the meter case in size. Therefore, the versatility is improved.

20 Claims, 9 Drawing Sheets

GPS-EQUIPPED METER

CROSS-REFERENCE TO RELATED APPLICATIONS

The present application claims priority under 35 USC 119 to Japanese Patent Application No. 2004-284911 filed on Sep. 29, 2004 and Japanese Patent Application No. 2005-200166 filed on Jul. 8, 2005 the entire contents of which are hereby incorporated by reference.

1. Field of the Invention

The present invention relates to a GPS-equipped meter which includes a GPS antenna for receiving a GPS signal and a GPS processing circuit which processes the GPS signal, and displays positional information calculated based on the GPS signal.

2. Description of Background Art

A GPS device which displays positional information by receiving a GPS signal has been in widespread use. A GPS device is used as a single unit for the purpose of displaying a current position. The GPS device is also used in a car navigation system which displays the current position on a map by combining the current position with geographical information and further guides the vehicle to a destination. Moreover, the widespread use of GPS devices has resulted in a reduction in the size and weight of the device. Thus, the GPS device may be installed not only in a car but also in a motorcycle and an ATV (All Terrain Vehicle).

Japanese Patent Laid-open No. Hei 11 (1999)-321754 and Japanese Patent Publication No. 3477287 disclose technology wherein a GPS device is installed in a scooter type motorcycle.

In the conventional technology described above, a GPS antenna for receiving a GPS signal and a GPS processing circuit which processes the GPS signal are housed in a dedicated case for GPS which is separate from a meter case including a display panel, and both cases are electrically connected to each other through a signal line. Therefore, an installation space for the dedicated case for GPS has to be newly secured in a vehicle body frame, and the signal line has to extend between the cases. Thus, there is a technical problem wherein a manufacturing process is complicated. Furthermore, since the meter case and the GPS case have to have a sealed structure for avoiding the effects of rain and wind, both require a sealing member such as an O ring.

Meanwhile, in order to facilitate the widespread use of GPS devices, it is desirable to share the same GPS devices with a plurality of vehicles and to promote a reduction in the number of man-hours and a cost reduction by sharing components. However, if the structure of a vehicle to which the GPS device is attached differ from each other even if the shape of the GPS case is the same, it is difficult to attach the GPS case in the same posture. Moreover, an attachment posture of the GPS case differs depending on the vehicles. If the attachment posture of the GPS case differs, the pointing direction of the GPS antenna is also changed. Thus, a position of the GPS antenna has to be adjusted for each vehicle. In general, the GPS case has no wasted space therein in order to minimize its external dimensions. Accordingly, it is difficult to adjust the position of the GPS antenna inside the GPS case.

SUMMARY AND OBJECTS OF THE INVENTION

It is an object of an embodiment of the present invention to provide a versatile GPS-equipped meter which solves the foregoing problems of the conventional technology that includes a GPS antenna and a GPS processing circuit in an existing meter unit that can be adapted to various vehicles.

In order to achieve the foregoing object, the present invention includes a GPS-equipped meter which includes a GPS processing circuit for processing a GPS signal and displays positional information based on the GPS signal.

(1) In an embodiment of the present invention a GPS-equipped meter includes a GPS antenna for receiving a GPS signal, a display panel for displaying the positional information, a meter case for housing the display panel, the GPS antenna and the GPS processing circuit, and an antenna supporting member for supporting the GPS antenna in a predetermined posture. In the meter, the meter case includes an antenna relief part for avoiding interference with the GPS antenna regardless of the posture of the GPS antenna.

(2) The display panel, the GPS antenna and the GPS processing circuit are disposed in a space sealed by the sealing member.

(3) The antenna supporting member includes a ground plate which is grounded, and a posture adjusting member in which one principal plane is mounted on a surface of the ground plate and the GPS antenna is mounted on the other principal plane. Moreover, the posture adjusting member is selected from a plurality of posture adjusting members having different angles formed by the one principal plane and the other principal plane.

(4) The ground plate and the posture adjusting member are fastened all together on the meter case with a screw from inside thereof.

(5) The GPS-equipped meter further includes a meter base for supplying a display signal to the display panel, and a panel supporting member for supporting the display panel in a projection region of the meter base on one principal plane of the meter base. The GPS processing circuit is disposed on the other principal plane of the meter base.

According to the present invention, the following effects are achieved.

In an embodiment of the present invention, since the GPS antenna and the GPS processing circuit can be housed in the same meter case, a dedicated case for GPS and a signal line are not required. Therefore, the number of components and of man-hour can be significantly reduced.

In an embodiment of the present invention GPS-related members (the GPS antenna and the GPS processing circuit) and constituent components (a display panel, a meter base and the like) disposed in the meter case, all of which have heretofore been sealed separately from each other, can be sealed by use of only the sealing member.

In an embodiment of the present invention, even if an attachment posture of the GPS-equipped meter to a vehicle body frame is different, the GPS antenna can be adjusted to have a desired posture just by replacing the posture adjusting member.

In an embodiment of the present invention, since the ground plate, the posture adjusting member and the meter case can be fixed together by use of the only screw, the number of fixing members can be reduced. Moreover, since the screw is fastened not from outside of the meter case but from inside thereof, it is not required to separately provide a sealing member for a screw hole in the meter case.

In an embodiment of the present invention, since a mounting density is increased by effectively utilizing an empty space, the meter case can be miniaturized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
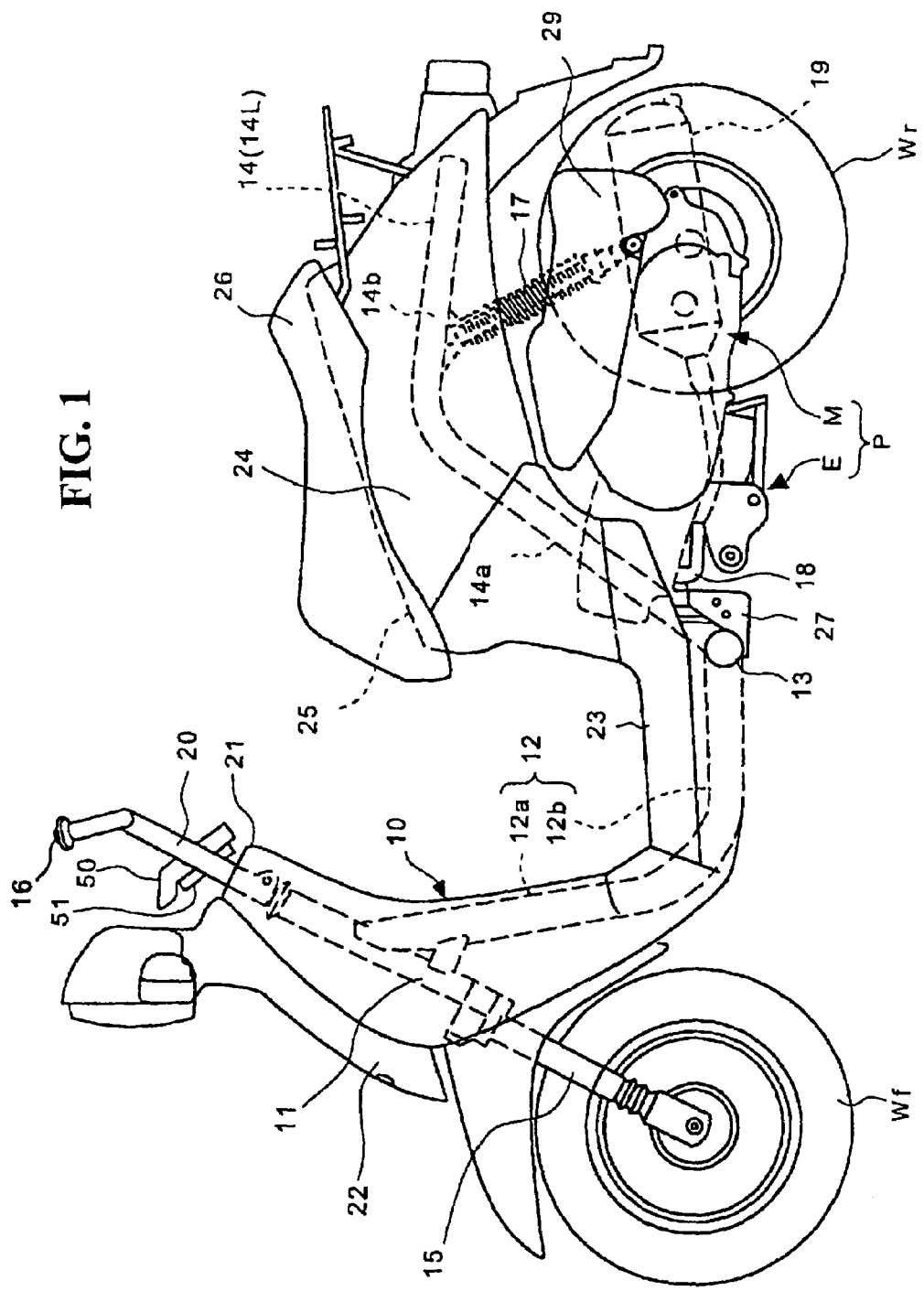
FIG. 1 is a side view of a scooter type motorcycle on which a GPS-equipped meter of the present invention is mounted.

With reference to the drawings, an embodiment of the present invention will be described in detail below. FIG. 1 is a side view of a scooter type motorcycle on which a GPS-equipped meter of the present invention is mounted.

A vehicle body frame 10 is mainly composed of a main frame tube 12 having a head tube 11 fixed to its front end with a cross tube 13 which is perpendicularly and horizontally fixed to a rear end of the main frame tube 12. A pair of left and right rear frame tubes 14 (14L and 14R) include front ends connected respectively to both ends of the cross tube 13.

The main frame tube 12 is formed by integrally providing a down frame part 12a, which is tilted rearwardly and downwardly from the head tube 11, and a lower frame part 12b, which extends approximately horizontally rearwardly from a rear end of the down frame part 12a. The cross tube 13 extends to the left and right of the vehicle body frame 10. The rear end of the main frame tube 12 is fixed at a right angle to a center portion of the cross tube 13. The pair of left and right rear frame tubes 14 are constituted by integrally providing rise frame parts 14a which extend rearwardly and upwardly from both ends of the cross tube 13 with upper frame parts 14b that extend approximately horizontally rearwardly from rear ends of the respective rise frame parts 14a and are curved within a horizontal plane so as to have their rear end openings facing each other.

A front fork 15 is provided as a steering member for supporting a front wheel Wf that is supported by the head tube 11 so as to be steerable. A steering handle 16 is connected to an upper end of the front fork 15 by use of a handle tube 20 as a handle connection member. In a center portion of the steering handle 16, a GPS-equipped meter 50 according to the present invention is mounted by use of a bracket 51, the meter being mounted in a posture where its display surface is directed to the line of sight of a driver.

In front portions of the rear frame tubes 14, a power unit P is supported so as to be swingable in an up-and-down direction. The power unit includes an engine E disposed in front of a rear wheel Wr and a continuously variable transmission M disposed on the left side of the rear wheel Wr. The rear wheel Wr is axially supported in a rear portion of the power unit P. An air cleaner 29 is disposed on the left side of an upper portion of the rear wheel Wr.

Between the rear portion of the power unit P and the left rear frame tube 14L, a rear suspension unit 17 is provided. An exhaust pipe 18 which guides exhaust gas from the engine E extends to the right side of the rear wheel Wr from the engine E. This exhaust pipe 18 is connected to an exhaust muffler 19 disposed on the right side of the rear wheel Wr. Between the front portions of the left and right rear frame tubes 14, a storage box 25 is supported so as to be disposed above the engine E.

The vehicle body frame 10 is covered with a vehicle body cover 21 made of synthetic resin. This vehicle body cover 21 includes a leg shield 22 for covering the front of the driver's legs with a step floor 23 connected to a lower portion of the leg shield 22, on which the driver puts his/her legs. A side cover 24 is connected to the step floor 23 and covers a rear part of a vehicle body from its both sides.

The storage box 25 and a fuel tank (not shown) are covered with the side cover 24, and a seat 26 covering the storage box 25 from above is attached so as to be openable and closable above the side cover 24. More specifically, the step floor 23 is formed in the vehicle body cover 21 so as to be disposed between the steering handle 16 and the seat 26. Moreover, below a rear end of the step floor 23, a frame side bracket 27 is disposed for supporting the power unit P so as to be swingable in the vehicle body frame 10.

Figure 2:
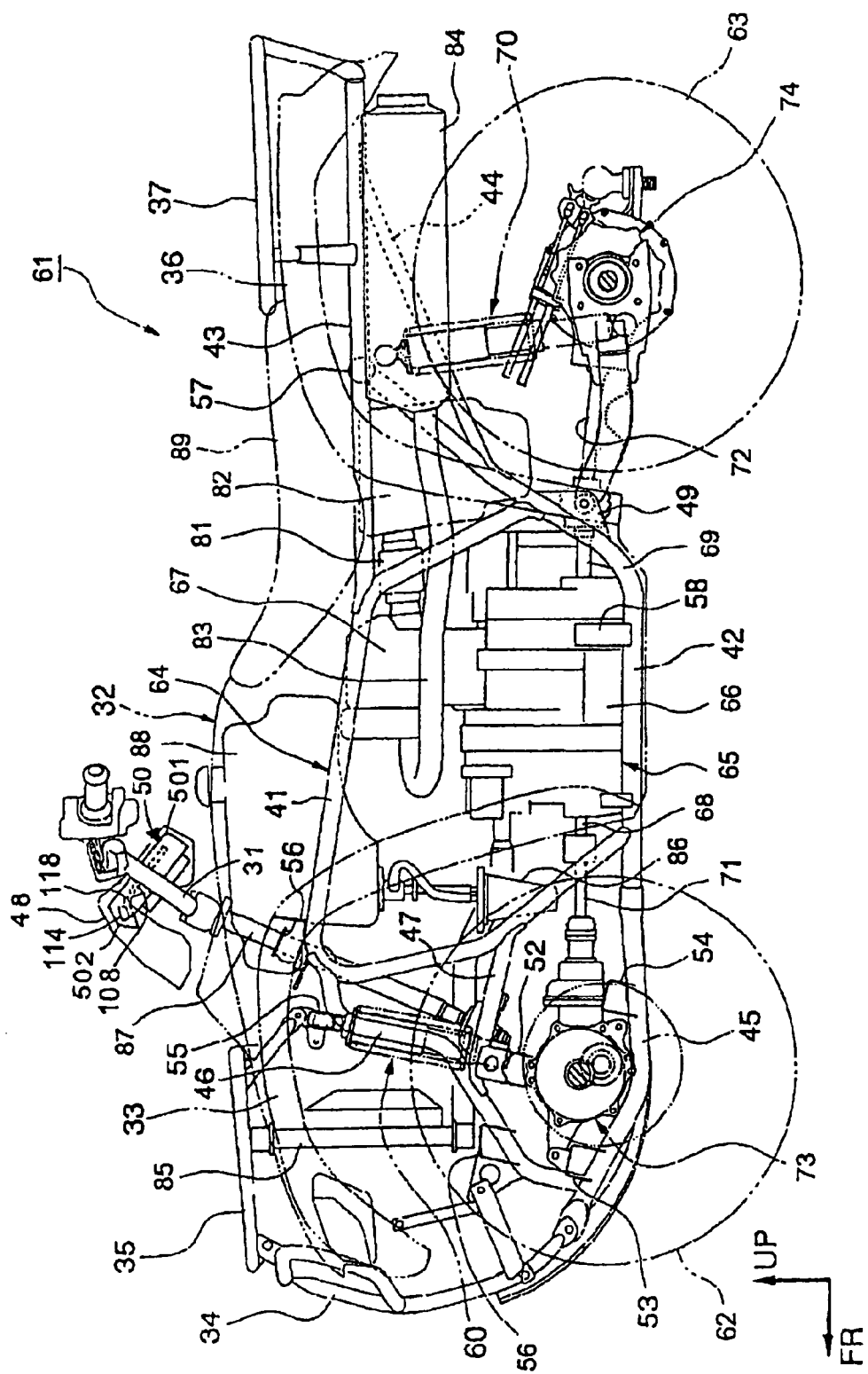
FIG. 2 is a side view of an ATV (All Terrain Vehicle) mounting the GPS-equipped meter of the present invention.

FIG. 2 is a side view of an ATV mounting the GPS-equipped meter according to the present invention. In the following description, the directions such as front, rear, left and right are assumed to be the same as those in the vehicle unless otherwise mentioned. Moreover, in FIG. 2, the arrow FR indicates the front of the vehicle, the arrow LH indicates the left-hand side of the vehicle, and the arrow UP indicates the upper side of the vehicle.

An ATV 61 secures a large minimum road clearance by including front wheels 62 and rear wheels 63 on its left and right sides, which are low-pressure balloon tires having relatively large diameters. The wheels 62, 63 are mounted in the front and rear of a vehicle body which is formed to be small and lightweight. Thus, the operation on irregular ground is mainly enhanced. Each of the front wheels 62 and the rear wheels 63 are suspended in front and rear portions of a vehicle body frame 64 by use of a front suspension 60 and a rear suspension 70, which will be described in detail later.

An engine 65 of the ATV 61 is mounted in approximately a center portion of the vehicle body frame 64. The engine 65, for example, a water-cooled single-cylinder reciprocal engine, is arranged in a vertical position by disposing a rotational axis of a crank shaft along a longitudinal direction of the vehicle. The engine 65 has a configuration in which a cylinder part 67 is provided upright on a crank case 66. Moreover, a front output shaft 68 and a rear output shaft 69 disposed along the longitudinal direction are drawn out forwardly and rearwardly, respectively, from a portion shifted to the left of the center of the left-and-right direction of the vehicle body in front and rear portions of the crank case 66.

Each of the output shafts 68 and 69 is connected to each of the front wheels 62 or each of the rear wheels 63 through a front drive shaft 71 or a rear drive shaft 72 and a front final reduction gear unit 73 or a rear final reduction gear unit 74. Therefore, output of the engine 65 is transmitted to the front wheels 62 and the rear wheels 63 from the respective output shafts 68 and 69 through the respective drive shafts 71 and 72, the final reduction gear units 73 and 74, and the like after being transmitted through an unillustrated transmission housed in the crank case 66.

Figure 3:
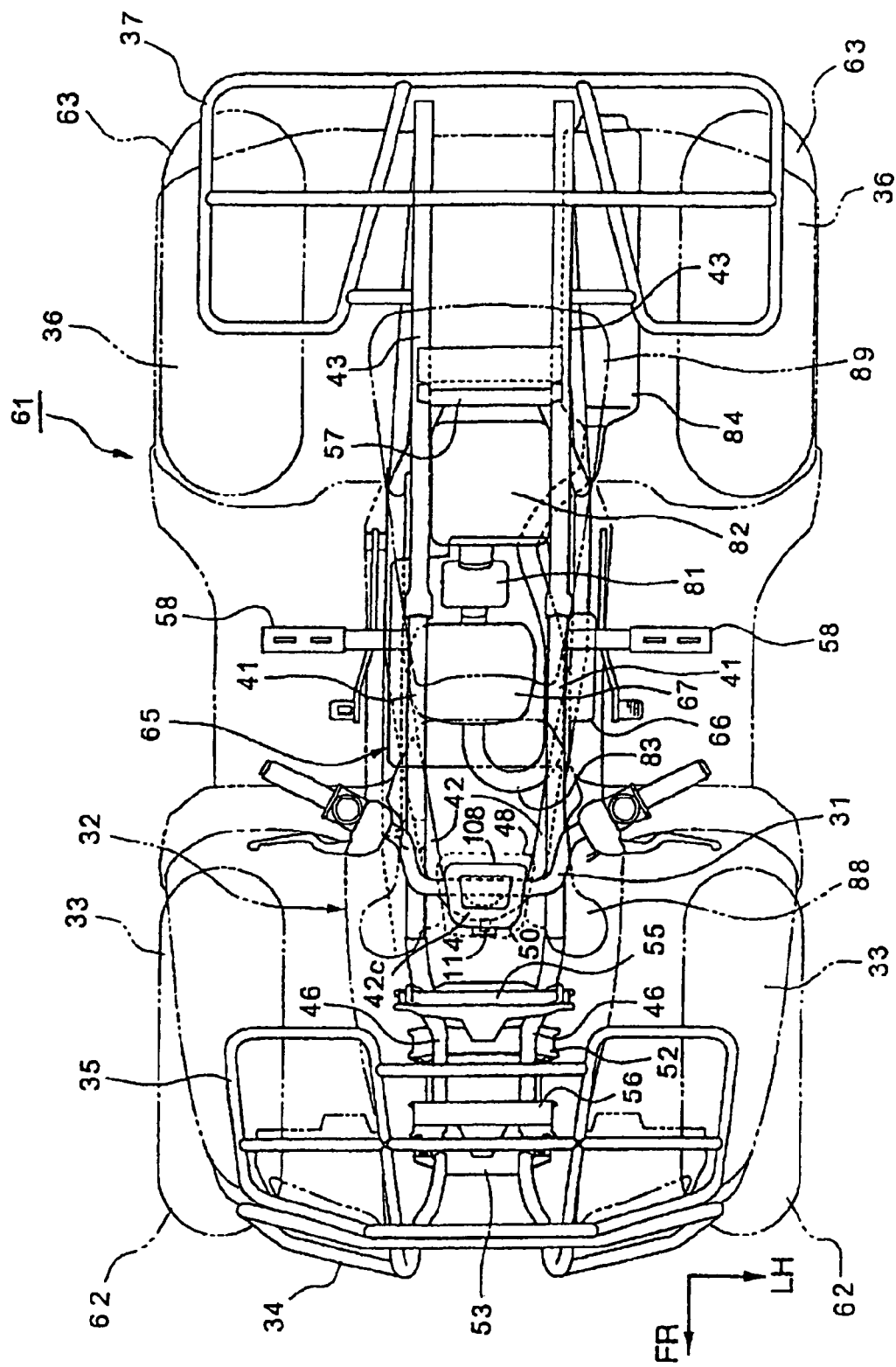
FIG. 3 is a top view of the ATV shown in FIG. 2.

With reference to FIG. 3 in conjunction with FIG. 2, a throttle body 81 is connected to a rear portion of the cylinder part 67 of the engine 65 with an air cleaner case 82 being connected to a rear portion of the throttle body 81. Moreover, a base of an exhaust pipe 83 is connected to a front portion of the cylinder part 67. This exhaust pipe 83 is folded after extending to the front of the cylinder part 67 and extends rearwardly while passing the left-hand side of the cylinder part 67 with its tip portion being connected to a muffler 84 in the rear portion of the vehicle body. In FIG. 2 a radiator 85 is provided for cooling the engine with a fuel pump 86 being provided for pressure-feeding fuel to an unillustrated injector.

In the center portion of the left-and-right direction of the vehicle body of the ATV 61, a steering shaft 87, a fuel tank 88, a saddle-riding seat 89 and the like are provided sequentially from the front. A lower end of the steering shaft 87 is connected to an unillustrated front wheel steering mechanism, and a handle 31 is attached to an upper end of the steering shaft 87. In the center of the handle 31, the GPS-equipped meter 50 is disposed that is covered with a meter cover 48.

Figure 4:
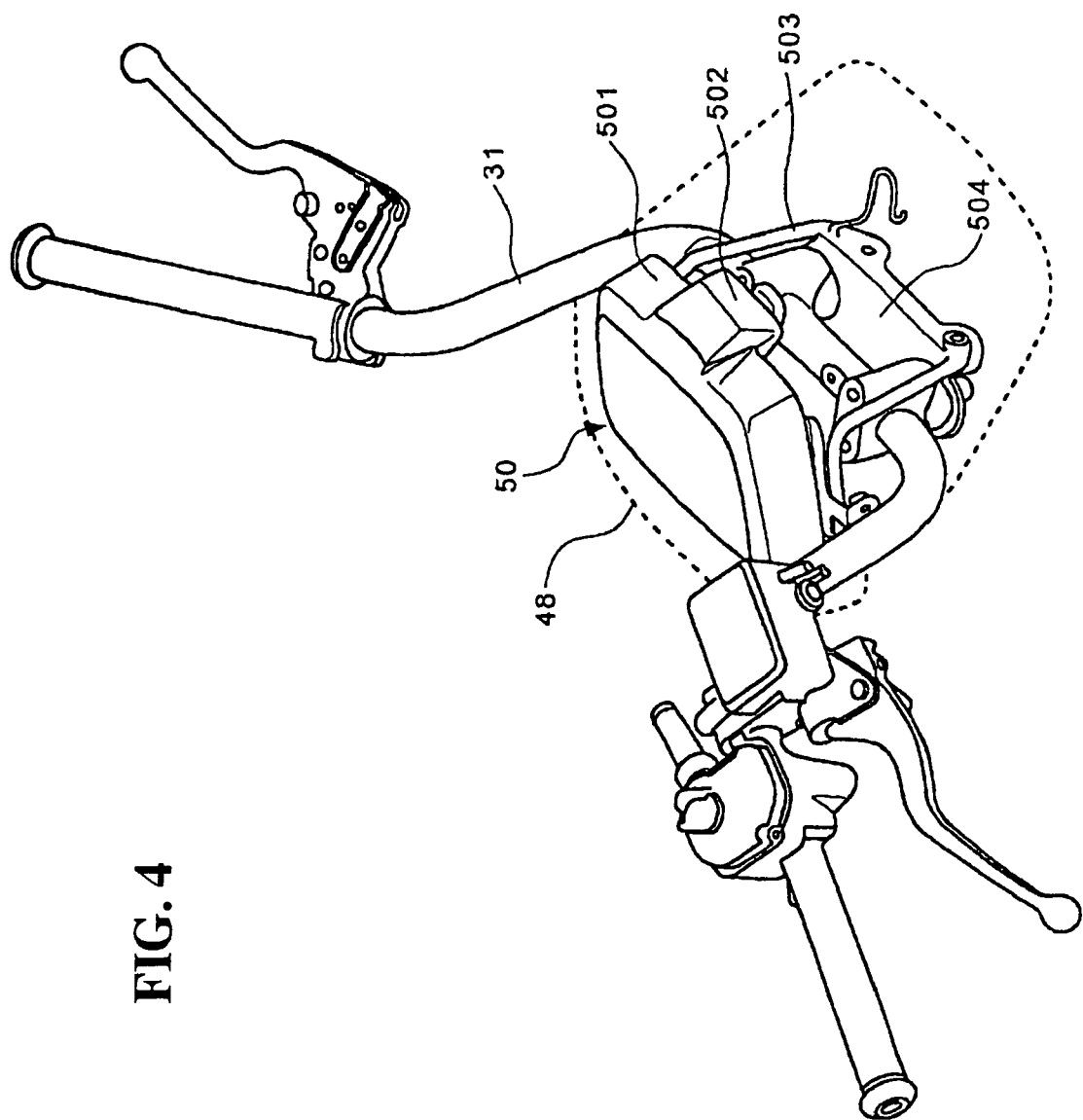
FIG. 4 is a perspective view showing an example of mounting the GPS-equipped meter in the ATV.

FIG. 4 is a perspective view showing a mounting portion of the GPS-equipped meter 50, which is viewed obliquely from the front. The GPS-equipped meter 50 mainly includes a main body part 501 in which a GPS processing circuit, a display panel and the like are housed, and an antenna part 502 in which a GPS antenna, a supporting member thereof and the like are housed. Moreover, the GPS-equipped meter 50 is supported by a meter bracket 503 and a handle supporting member 504 so as to be sandwiched between left and right handle bar parts in a U-shaped concave portion of the handle 31. The GPS-equipped meter 50 described above includes a liquid crystal display panel 108, a GPS antenna 114 and the like (see FIGS. 2 and 3), as described in detail later. The GPS antenna 114 is supported in an upward pointing posture by a supporting member including an antenna base 118.

In the front portion of the vehicle body frame 64, a vehicle body cover 32 is provided which is made of resin and covers the front portion of the vehicle body. A front fender 33 is provided which is also made of resin and covers each of the front wheels 62 over a back side thereof from above. In addition, a front protector 34 and a front carrier 35 are attached which are mainly made of steel and the like. In the rear portion of the vehicle body frame 64, a rear fender 36 is provided, which is made of resin and covers each of the rear wheels 63 over a front side thereof from above. A rear carrier 37 is attached thereto that is mainly made of steel and the like.

Figure 5:
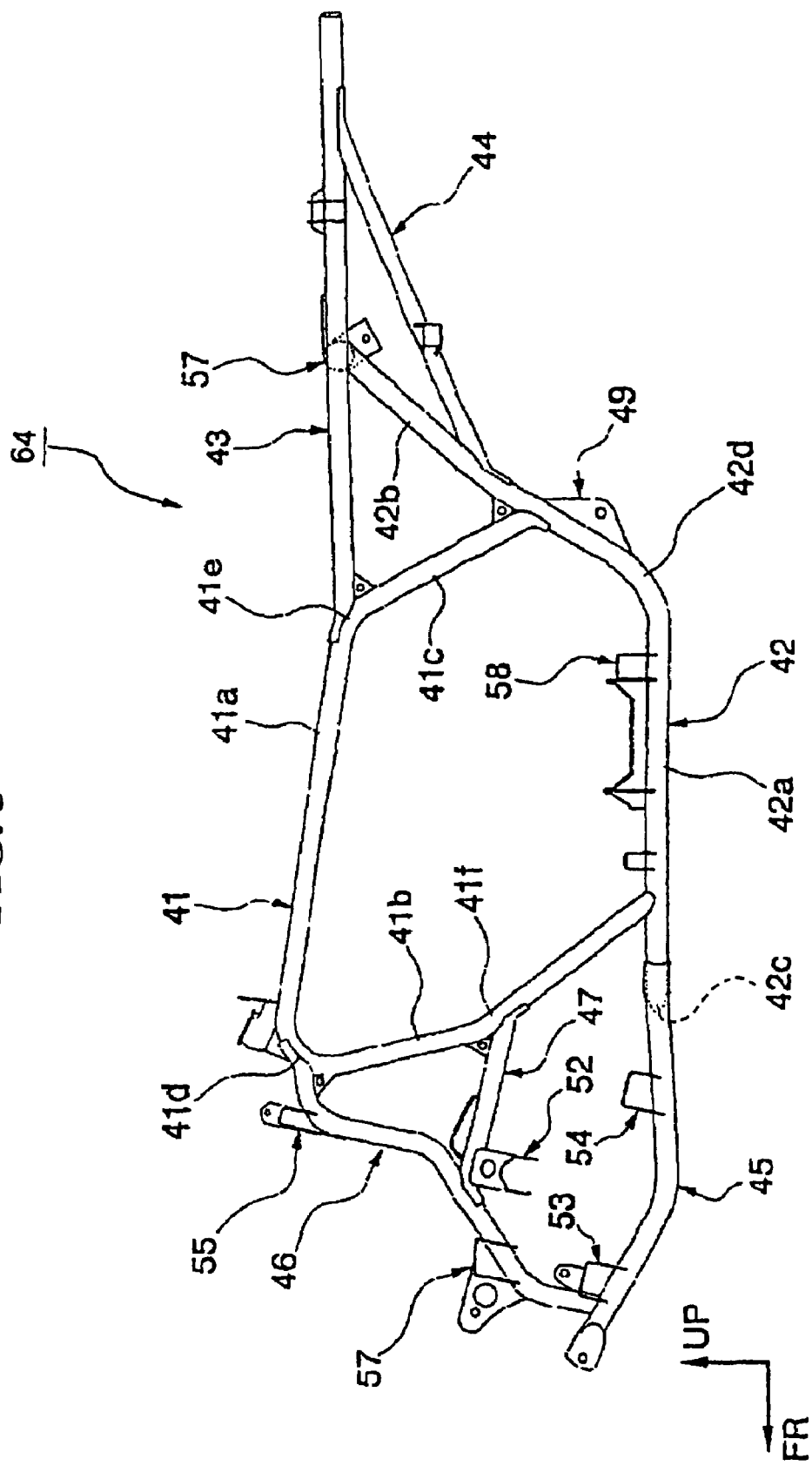
FIG. 5 is a side view of a vehicle body frame of the ATV shown in FIGS. 2, 3 and 4.

With reference to FIG. 5 in conjunction with FIG. 4, the vehicle body frame 64 is constituted by integrally connecting a plurality of kinds of steel parts by welding or the like. To be more specific, an appropriate closed loop structure is formed by use of left and right upper tubes 41 and lower tubes 42 and the like. Moreover, by connecting the tubes through a plurality of cross members, a box structure which is long in the longitudinal direction is formed in the center portion of the left-and-right direction of the vehicle body.

Each of the upper tubes 41 is constituted by bending one steel pipe so as to integrally form an upper slope portion 41a which is tilted slightly rearwardly and downwardly outside the upper part of the vehicle body frame 64 with a front slope portion 41b which extends obliquely rearwardly and downwardly from a front end of the upper slope portion 41a so as to form an acute angle with the upper slope portion 41a, and a rear slope portion 41c which is extended obliquely rearwardly and downwardly from a rear end of the upper slope portion 41a so as to form an obtuse angle with the upper slope portion 41a. The description will be given below by assuming that, in each of the upper tubes 41, a bend portion between the upper slope portion 41a and the front slope portion 41b is a front bend portion 41d, and a bend portion between the upper slope portion 41a and the rear slope portion 41c is a rear bend portion 41e. Moreover, a description will be given by assuming that a bend portion having a convex shape toward the front approximately in the center of the front slope portion 41b is a middle bend portion 41f.

Each of the lower tubes 42 is formed by bending one steel pipe so as to integrally form a lower horizontal portion 42a which is approximately horizontally disposed outside the lower part of the vehicle body frame 64, and a rear slope portion 42b which extends obliquely rearwardly and upwardly from a rear end of the lower horizontal portion 42a so as to form an obtuse angle with the lower horizontal portion 42a. Moreover, the respective lower tubes 42 are provided so as to connect the front ends (front ends of the lower horizontal portions 42a) through an arc-shaped portion 42c (see FIG. 3) which has a convex shape toward the front when viewed from the upper side of the vehicle body. In other words, the lower tubes 42 are provided so as to have an integral structure. The description will be given below by assuming that a bend portion between the lower horizontal portion 42a and the rear slope portion 42b in each of the lower tubes 42 is a lower bend portion 42d.

The front slope portion 41b of the respective upper tubes 41 has its lower end bonded near the front end of the lower horizontal portion 42a of the lower tube 42 on the same side. Moreover, the rear slope portion 41c of the upper tube 41 has its lower end bonded to approximately a center portion in a longitudinal direction of the rear slope portion 42b of the lower tube 42 on the same side. On the back of the lower side of the rear slope portion 41c of the respective upper tubes 41, left and right pivot brackets 49 are integrally provided, each of which has an approximately triangular shape that is flat in the longitudinal direction. The respective pivot brackets 49 are for supporting a front end of a swing arm 71 in the rear suspension 70.

To the rear bend portions 41e of the respective upper tubes 41, front ends of left and right rear upper tubes 43 as approximately horizontally provided seat rails are bonded, respectively. In an approximately center portion in a longitudinal direction of each of the rear upper tubes 43, an upper end of the rear slope portion 42b of the lower tube 42 on the same side is bonded. Between the approximately center portion in the longitudinal direction of the rear slope portion 42b of the respective lower tubes 42 and the rear end of the rear upper tube 43 on the same side, each of left and right rear sub-tubes 44 are provided which are tilted rearwardly and upwardly. Here, a cross member provided between the approximately center portions in the longitudinal direction of the respective rear upper tubes 43 is set to be a rear cross tube 57.

In the vicinity of the front end of the lower horizontal portion 42a of the respective lower tubes 42, a rear end of each of approximately horizontally provided left and right front lower tubes 45 is bonded. Each of the front lower tubes 45 is bent obliquely upwardly and forwardly at a position near an axle of the front wheel 62 when viewed from the side of the vehicle body. Moreover, a lower end of the front protector 34 is supported at a front end of the front lower tube 45. In a step 58 for a driver, a step board 58a is attached that extends over the front fender 33 and the rear fender 36.

To the front bend portion 41d of the respective upper tubes 41, an upper end of each of left and right front cushion tubes 46 is bonded, which extends close to the front end of the front lower tube 45 on the same side from the bend portion 41d. Each of the front shock absorber tubes 46 is bent obliquely forward and downward shortly after extending forward from the front bend portion 41d of the upper tube 41 on the same side. Moreover, the front shock absorber tube 46 is bent to have a gentle crank shape so as to position its lower part in front of its upper part, and has its lower end bonded close to the front end of the front lower tube 45 on the same side. Between an approximately center portion in a vertical direction of the respective front cushion tubes 46 and the middle bend portion 41f of the upper tube 41 on the same side, each of left and right front sub-tubes 47 is provided, which are tilted slightly forwardly and upwardly.

Between the respective front shock absorber tubes 46, a middle front cross beam 56 and an upper center cross beam 55 are provided that extend along the left-and-right direction. Similarly, between the respective front lower tubes 45, a lower front cross beam 53 and a lower rear cross beam 54 are provided. Moreover, between the respective front sub-tubes 47, a middle rear cross beam 52 is provided.

Figure 6:
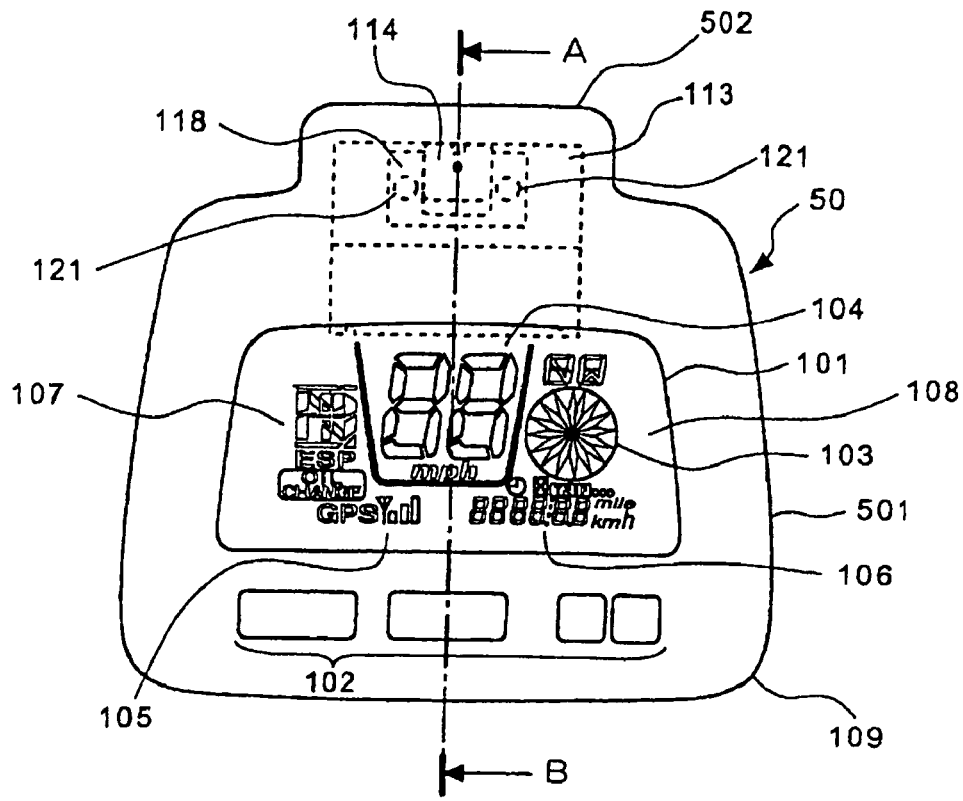
FIG. 6 is a front view of an embodiment of the GPS-equipped meter.
Figure 7:
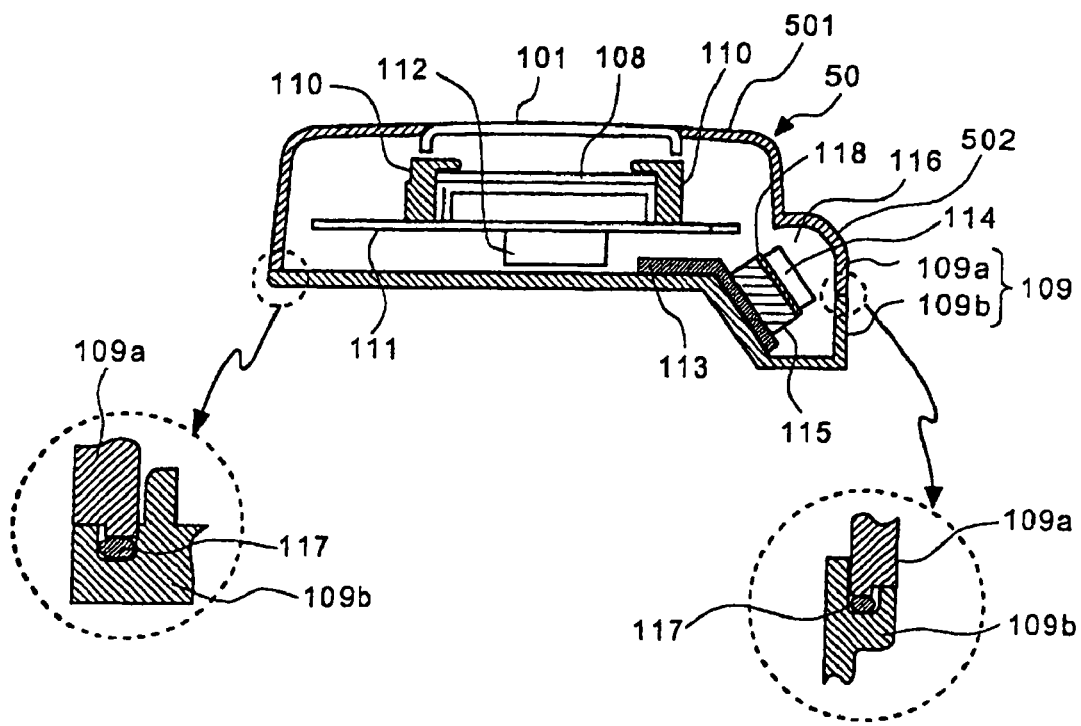
FIG. 7 is a cross-sectional view along the line A-B in FIG. 6.

FIG. 6 is a front view of an embodiment of the GPS-equipped meter 50. FIG. 7 is a cross-sectional view along the line A-B in FIG. 6. In FIG. 7, the illustration of a configuration not required for a description of the present invention is omitted.

On a front side of the GPS-equipped meter 50, a liquid crystal display window 101 and various key switches 102 are disposed. In addition, a principal plane of a liquid crystal display panel 108 is exposed from the liquid crystal display window 101. The GPS-equipped meter 50 includes a GPS antenna 114 and a GPS processing circuit 112 in a case 109 thereof that displays on the liquid crystal display panel 108 the positional information calculated based on a GPS signal. Note that, in this embodiment, the GPS-equipped meter 50 also serves as a speed meter that also displays on the liquid crystal display panel 108 information concerning a vehicle speed detected by an unillustrated speed sensor and the distance traveled.

The meter case 109 is composed of an upper case half body 109a and a lower case half body 109b with both being attached to each other by use of an O ring 117 that is the only sealing member, as shown in a close-up view in the broken circles in FIG. 7. Therefore, the liquid crystal display panel 108, the GPS antenna 114 and the GPS processing circuit 112 are disposed in a space sealed only by the sealing member.

As shown in FIG. 6 as an example, in the liquid crystal display panel 108, the following patterns are provided together with various alarm display patterns, which include a direction display pattern 103 for displaying the direction of a final destination and a traveling direction in a 16-way split mode. In addition, a speed display pattern 104 displays a vehicle speed. Further, a GPS reception level display pattern 105 displays a detection level of a GPS signal with a multidisplay pattern 106 for selectively displaying a distance traveled, elapsed time, current time and the like with a speed change gear display pattern 107 and the like, for displaying a speed change gear.

The liquid crystal display panel 108 is supported by a supporting member 110 which is provided upright on a meter base 111. On a rear surface of the meter base 111, the GPS processing circuit 112 is mounted, for calculating a current position by receiving and analyzing a GPS signal. On a bottom face inside the meter case 109, a ground plate 113 is fixed which is grounded. Moreover, an antenna base 118 is fixed onto a surface of the ground plate 113 with a posture adjusting member 115 interposed therebetween. Furthermore, the GPS antenna 114 having a flat plate shape is mounted on the antenna base 118. As described in detail later, the posture adjusting member 115 is selectively replaced according to a posture of the GPS-equipped meter 50 attached to the vehicle body frame so as to enable the GPS antenna 114 to be pointed to a predetermined direction regardless of the attachment posture of the GPS-equipped meter 50.

In a portion of the meter case 109, in which the GPS antenna 114 is housed, an antenna relief part 116 is secured so as not to allow the GPS antenna 114 and an inner wall of the meter case 109 to interfere with each other regardless of which direction the GPS antenna 114 is pointed and supported by the posture adjusting member 115.

Figure 8:
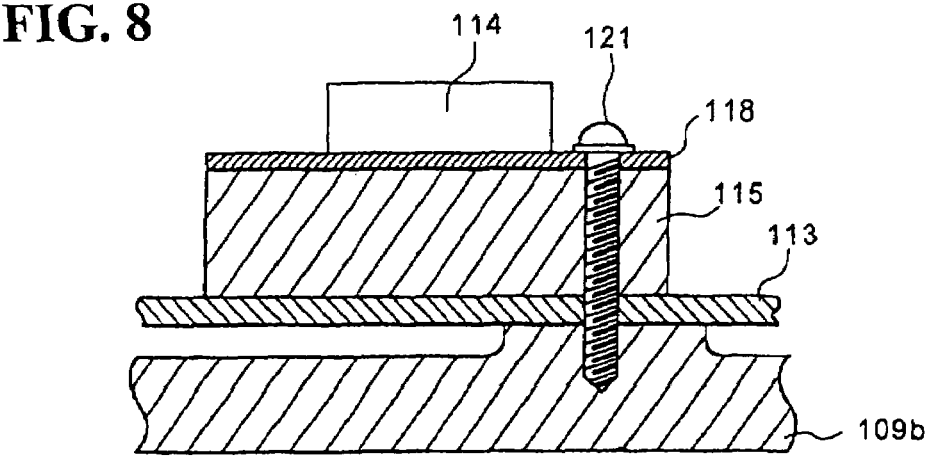
FIG. 8 is a cross-sectional view showing a fixation structure of a GPS antenna.

FIG. 8 is an enlarged cross-sectional view showing a method for fixing the meter case 109, the ground plate 113, the posture adjusting member 115, the antenna base 118 and the GPS antenna 114. In FIG. 7, the same reference numerals as those described above indicate the same or similar parts.

In this embodiment, the antenna base 118, the posture adjusting member 115 and the ground plate 113 are fastened all together on the meter case 109 (109b) by use of a screw 121 mounted from inside the meter case 109 (109).

Figure 9:
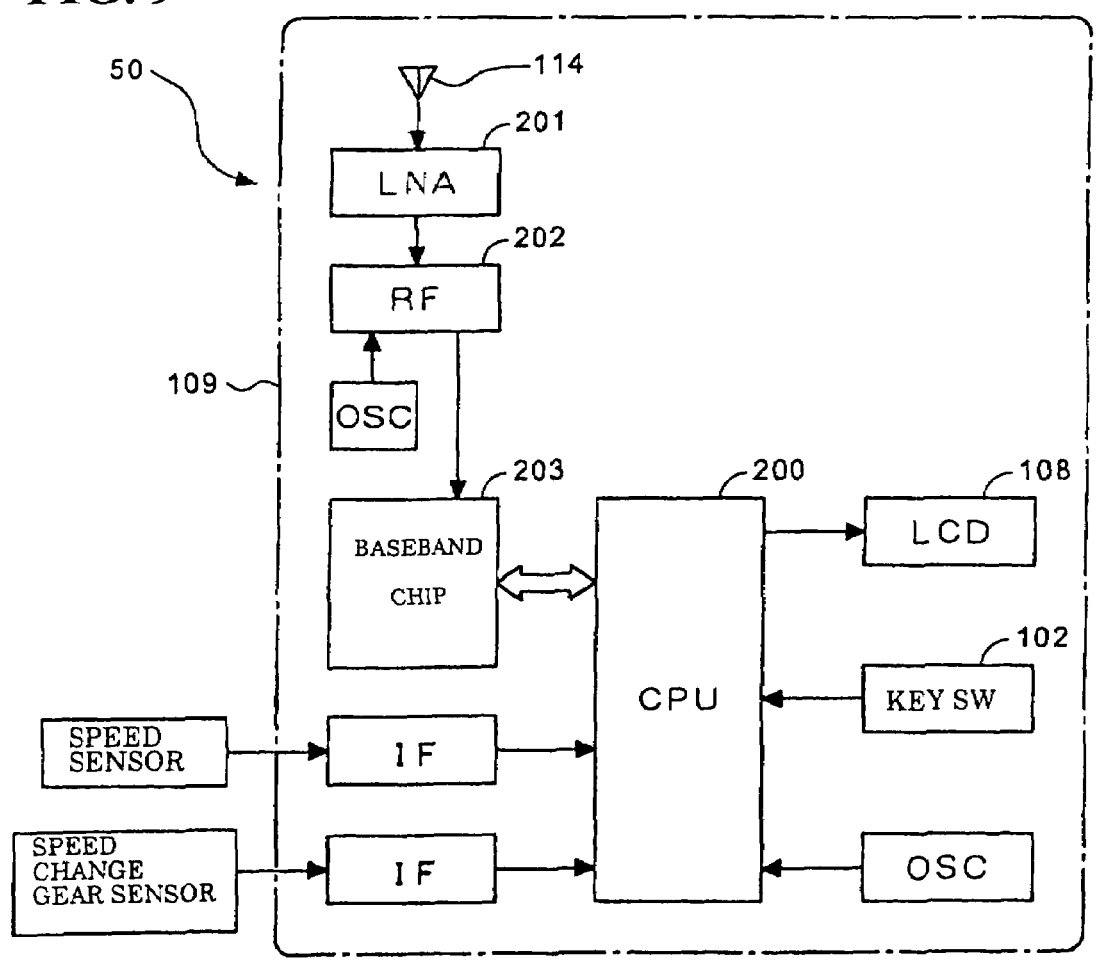
FIG. 9 is a block diagram showing a configuration of a main part of the GPS-equipped meter.

FIG. 9 is a block diagram showing a configuration of a main part of the GPS-equipped meter 50. A GPS signal received by the GPS antenna 114 is inputted to a baseband chip 203 via an RF circuit 202 after being amplified by a LNA (low noise amplifier) 201. The baseband chip 202 calculates a current position based on the GPS signal transmitted from a plurality of GPS satellites and transfers the current position to a CPU 200. Heretofore, the GPS antenna 114, the LNA 201, the RF circuit 202, the baseband chip 203 and the like have been housed in a case different from the meter case 109. However, in this embodiment, the items described above are included in the meter case 109.

Figure 10A:
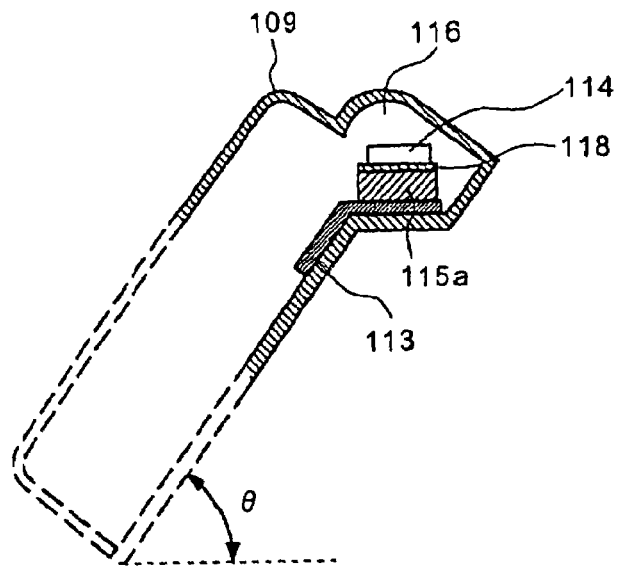
FIGS. 10(a) to 10(c) are schematic views showing how a shape of an antenna supporting member is changed according to attachment postures of the GPS-equipped meter to a vehicle body frame.
Figure 10B:
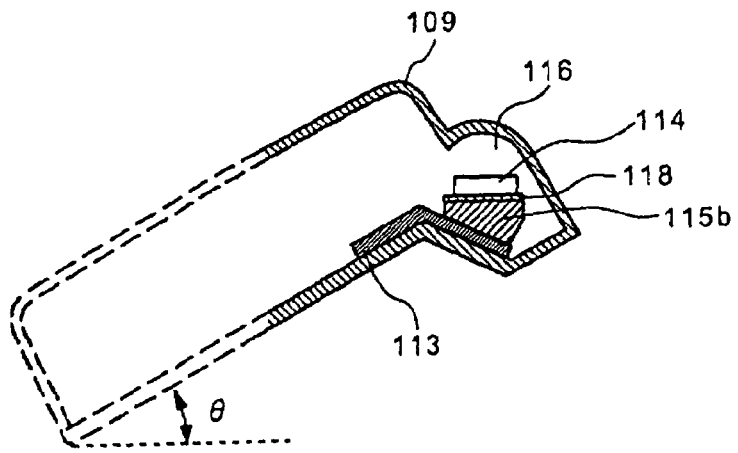
Figure 10C:
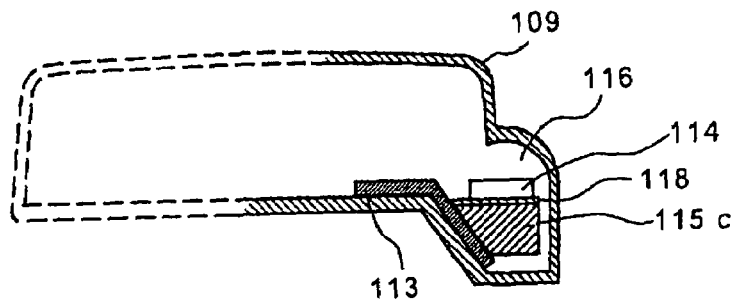

FIGS. 10(a) to 10(c) are schematic views showing how the shape of the posture adjusting member 115 is changed according to attachment postures of the GPS-equipped meter 50 to the vehicle body frame. In this embodiment, the posture adjusting members 115 (115a to 115c) having different shapes according to an attachment angle θ of the GPS-equipped meter 50 to the vehicle body frame are appropriately selected so as to point the GPS antenna 114 to the sky regardless of the attachment angle θ.

More specifically, in this embodiment, the plurality of posture adjusting members 115 are prepared, which have different angles formed by one principal plane mounted on the surface of the ground plate and the other principal plane on which the GPS antenna is mounted. According to the attachment angle θ, the optimum posture adjusting member 115 is selected.

In this event, the antenna relief part 116 is secured in the meter case 109 in this embodiment. Accordingly, even if a relative positional relationship between the meter case 109 and the GPS antenna 114 is changed due to a change in the shape of the posture adjusting member 115 (115a to 115c), the meter case 109 and the GPS antenna 114 never interfere with each other. Thus, the GPS-equipped meter 50 can be shared with various vehicles without increasing the meter case 109 in size. Therefore, the versatility is improved.

Figure 11A:
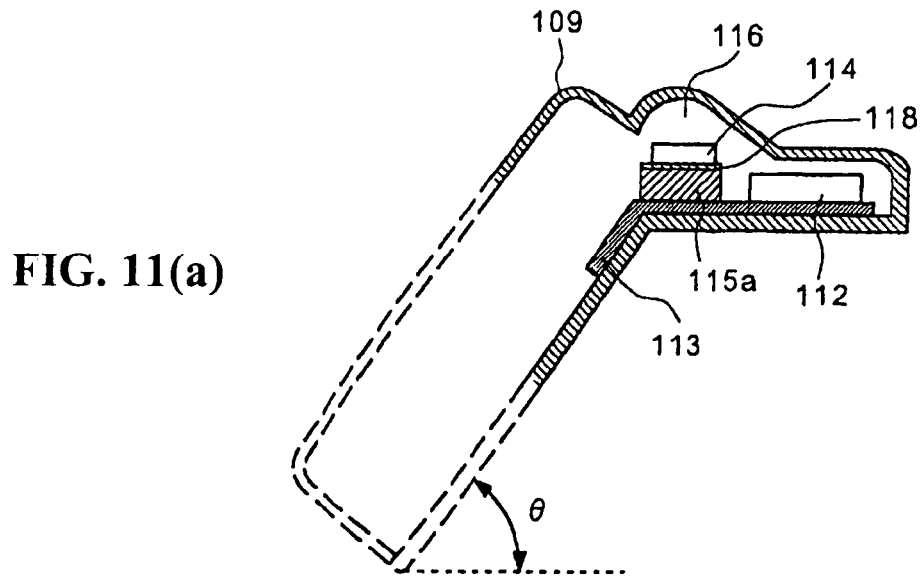
FIGS. 11(a) to 11(c) are cross-sectional views showing another embodiment of the GPS-equipped meter.
Figure 11B:
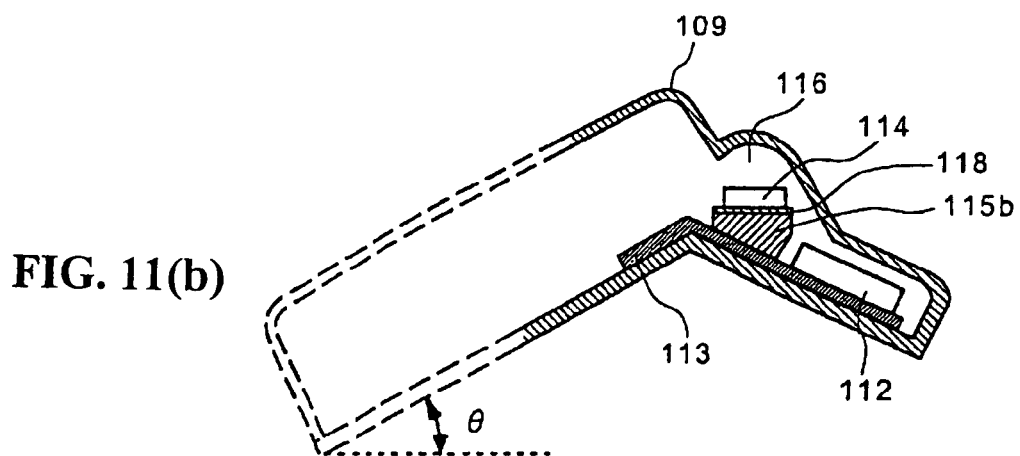
Figure 11C:
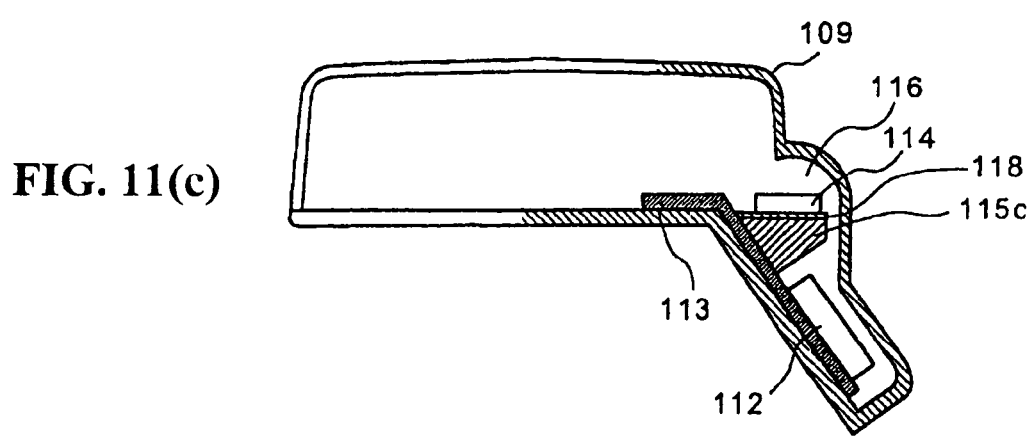

Note that, although the description was given by assuming that the GPS processing circuit 112 is mounted on the rear surface of the meter base 111 in the embodiment described above, the present invention is not limited thereto. As shown in FIGS. 11(a) to 11(c) as an example, the GPS processing circuit 112 may be separated from the meter base 111. Also in this case, the posture adjusting members 115 (115a to 115c) having different shapes according to the attachment angle θ of the GPS-equipped meter 50 to the vehicle body frame are appropriately selected so as to point the GPS antenna 114 to the sky regardless of the attachment angle θ.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A GPS-equipped meter which includes a GPS processing circuit for processing a GPS signal and displays positional information based on the GPS signal, comprising:
    a GPS antenna which receives a GPS signal;
    a display panel which displays the positional information;
    a meter case which houses the display panel, the GPS antenna and the GPS processing circuit; and
    an antenna supporting member which supports the GPS antenna in a predetermined posture,
    wherein the meter case includes an antenna relief part which avoids interference with the GPS antenna regardless of the posture of the GPS antenna, and
    wherein the meter case includes an upper case half body and a lower case half body, and the antenna supporting member is fixed on a bottom face inside the meter case.

2. The GPS-equipped meter according to claim 1, wherein the display panel, the GPS antenna and the GPS processing circuit are disposed in a space sealed by the same sealing member.

3. The GPS-equipped meter according to claim 1, wherein the antenna supporting member includes a ground plate which is grounded, and a posture adjusting member in which one principal plane is mounted on a surface of the ground plate and the GPS antenna is mounted on the other principal plane, and the posture adjusting member is selected from a plurality of posture adjusting members having different angles formed by the one principal plane and the other principal plane.

4. The GPS-equipped meter according to claim 2, wherein the antenna supporting member includes a ground plate which is grounded, and a posture adjusting member in which one principal plane is mounted on a surface of the ground plate and the GPS antenna is mounted on the other principal plane, and the posture adjusting member is selected from a plurality of posture adjusting members having different angles formed by the one principal plane and the other principal plane.

5. The GPS-equipped meter according to claim 3, wherein the ground plate and the posture adjusting member are fastened all together on the meter case with a screw from inside thereof.

6. The GPS-equipped meter according to claim 4, wherein the ground plate and the posture adjusting member are fastened all together on the meter case with a screw from inside thereof.

7. The GPS-equipped meter according to 1, further comprising:
    a meter base which supplies a display signal to the display panel; and
    a panel supporting member which supports the display panel in a projection region of the meter base on one principal plane of the meter base,
    wherein the GPS processing circuit is disposed on the other principal plane of the meter base.

8. The GPS-equipped meter according to 2, further comprising:
    a meter base which supplies a display signal to the display panel; and
    a panel supporting member which supports the display panel in a projection region of the meter base on one principal plane of the meter base,
    wherein the GPS processing circuit is disposed on the other principal plane of the meter base.

9. The GPS-equipped meter according to 3, further comprising:
    a meter base which supplies a display signal to the display panel; and
    a panel supporting member which supports the display panel in a projection region of the meter base on one principal plane of the meter base,
    wherein the GPS processing circuit is disposed on the other principal plane of the meter base.

10. The GPS-equipped meter according to 5, further comprising:
    a meter base which supplies a display signal to the display panel; and
    a panel supporting member which supports the display panel in a projection region of the meter base on one principal plane of the meter base,
    wherein the GPS processing circuit is disposed on the other principal plane of the meter base.

11. A meter case for use with a GPS-equipped meter comprising:
    a GPS antenna which receives a GPS signal;
    a meter case for housing the GPS antenna;
    an antenna supporting member for supporting the GPS antenna in a predetermined posture; and
    an antenna relief portion provide in said meter case for avoiding interference with the GPS antenna regardless of the posture of the GPS antenna,
    wherein the meter case includes an upper case half body and a lower case half body, and the antenna supporting member is fixed on a bottom face inside the meter case.

12. The meter case according to claim 11, wherein a display panel, the GPS antenna and a GPS processing circuit are disposed in a space sealed by the same sealing member.

13. The meter case according to claim 11, wherein the antenna supporting member includes a ground plate which is grounded, and a posture adjusting member in which one principal plane is mounted on a surface of the ground plate and the GPS antenna is mounted on the other principal plane, and the posture adjusting member is selected from a plurality of posture adjusting members having different angles formed by the one principal plane and the other principal plane.

14. The meter case according to claim 12, wherein the antenna supporting member includes a ground plate which is grounded, and a posture adjusting member in which one principal plane is mounted on a surface of the ground plate and the GPS antenna is mounted on the other principal plane, and the posture adjusting member is selected from a plurality of posture adjusting members having different angles formed by the one principal plane and the other principal plane.

15. The meter case according to claim 13, wherein the ground plate and the posture adjusting member are fastened all together on the meter case with a screw from inside thereof.

16. The meter case according to claim 14, wherein the ground plate and the posture adjusting member are fastened all together on the meter case with a screw from inside thereof.

17. The meter case according to claim 11, further comprising:
a meter base which supplies a display signal to a display panel; and
a panel supporting member which supports the display panel in a projection region of the meter base on one principal plane of the meter base; and
a GPS processing circuit disposed on the other principal plane of the meter base.

18. The meter case according to 12, further comprising:
a meter base which supplies a display signal to the display panel; and
a panel supporting member which supports the display panel in a projection region of the meter base on one principal plane of the meter base,
wherein the GPS processing circuit is disposed on the other principal plane of the meter base.

19. The meter case according to 13, further comprising:
a meter base which supplies a display signal to a display panel; and
a panel supporting member which supports the display panel in a projection region of the meter base on one principal plane of the meter base; and
a GPS processing circuit disposed on the other principal plane of the meter base.

20. The meter case according to 15, further comprising:
a meter base which supplies a display signal to a display panel; and
a panel supporting member which supports the display panel in a projection region of the meter base on one principal plane of the meter base; and
a GPS processing circuit disposed on the other principal plane of the meter base.

* * * * *